United States Patent
Sutton et al.

(10) Patent No.: US 10,272,918 B2
(45) Date of Patent: Apr. 30, 2019

(54) VEHICLE CONTROL SYSTEM AND METHOD

(71) Applicant: JAGUAR LAND ROVER LIMITED, Warwickshire (GB)

(72) Inventors: Simon Sutton, Coventry (GB); Malkit Ram, Coventry (GB); Sam Burt, Coventry (GB); Steve Mullane, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 486 days.

(21) Appl. No.: 14/907,311

(22) PCT Filed: Jul. 24, 2014

(86) PCT No.: PCT/EP2014/065915
§ 371 (c)(1),
(2) Date: Jan. 25, 2016

(87) PCT Pub. No.: WO2015/011225
PCT Pub. Date: Jan. 29, 2015

(65) Prior Publication Data
US 2016/0167663 A1     Jun. 16, 2016

(30) Foreign Application Priority Data

Jul. 25, 2013    (GB) .................................. 1313262.6

(51) Int. Cl.
*B60W 30/19*    (2012.01)
*B60K 17/346*    (2006.01)
(Continued)

(52) U.S. Cl.
CPC ......... *B60W 30/19* (2013.01); *B60K 17/3467* (2013.01); *B60W 10/111* (2013.01);
(Continued)

(58) Field of Classification Search
CPC .. B60W 10/06; B60W 10/111; B60W 10/119; B60W 10/18; B60W 30/19
See application file for complete search history.

(56) References Cited

U.S. PATENT DOCUMENTS 4,883,138 A * 11/1989 Kameda ............. B60K 17/3467
                                                           180/249
5,522,777 A *  6/1996 Baxter ................ B60K 23/0808
                                                           180/247
(Continued)

FOREIGN PATENT DOCUMENTS

JP    S59175752 U    11/1984
JP    H10272945 A    10/1998
(Continued)

OTHER PUBLICATIONS

Combined Search and Examination Report under Sections 17 and 18(3) for Application No. GB1313262.6 dated Feb. 7, 2014.
(Continued)

*Primary Examiner* — Edwin A Young
(74) *Attorney, Agent, or Firm* — Carlson, Gaskey & Olds

(57) ABSTRACT

Aspects of the present invention relates to a vehicle control system (1) for controlling a vehicle transfer case (3). The transfer case (3) is operable in a high range and a low range. The vehicle control system (1) is configured to output a range change signal to implement a transfer case range change. The vehicle control system (1) also outputs a brake control signal for controlling vehicle braking during the range change. The present invention also relates to a vehicle (5) and a related method of operating a vehicle control system (1) and optionally also a transmission (7).

23 Claims, 7 Drawing Sheets

(51) Int. Cl.
  *B60W 10/119* (2012.01)
  *F16H 61/70* (2006.01)
  *B60W 50/08* (2012.01)
  *B60W 10/111* (2012.01)
  *B60W 10/184* (2012.01)
  *B60W 30/18* (2012.01)
  *B60W 30/182* (2012.01)
  *B60W 10/18* (2012.01)
  *F16H 61/02* (2006.01)
  *F16H 61/16* (2006.01)

(52) U.S. Cl.
  CPC .......... *B60W 10/119* (2013.01); *B60W 10/18* (2013.01); *B60W 10/184* (2013.01); *B60W 30/182* (2013.01); *B60W 30/18054* (2013.01); *B60W 50/082* (2013.01); *B60W 50/085* (2013.01); *F16H 61/0204* (2013.01); *F16H 61/16* (2013.01); *F16H 61/702* (2013.01); *B60W 2520/10* (2013.01); *B60W 2520/105* (2013.01); *B60W 2540/04* (2013.01); *B60W 2540/12* (2013.01); *B60W 2540/16* (2013.01); *B60W 2540/165* (2013.01)

(56) References Cited

U.S. PATENT DOCUMENTS

| | | |
|---|---|---|
| 2006/0252598 A1 | 11/2006 | Eckle et al. |
| 2012/0029781 A1 | 2/2012 | Dickinson et al. |

FOREIGN PATENT DOCUMENTS

| | | |
|---|---|---|
| JP | 2001287557 A | 10/2001 |
| JP | 2002098215 A | 4/2002 |
| JP | 2003000003 U | 5/2003 |
| JP | 2004314861 A | 11/2004 |
| WO | 2004033244 A1 | 4/2004 |

OTHER PUBLICATIONS

International Search Report and Written Opinion for International Application No. PCT/EP2014/065915 dated Jan. 13, 2015.

\* cited by examiner

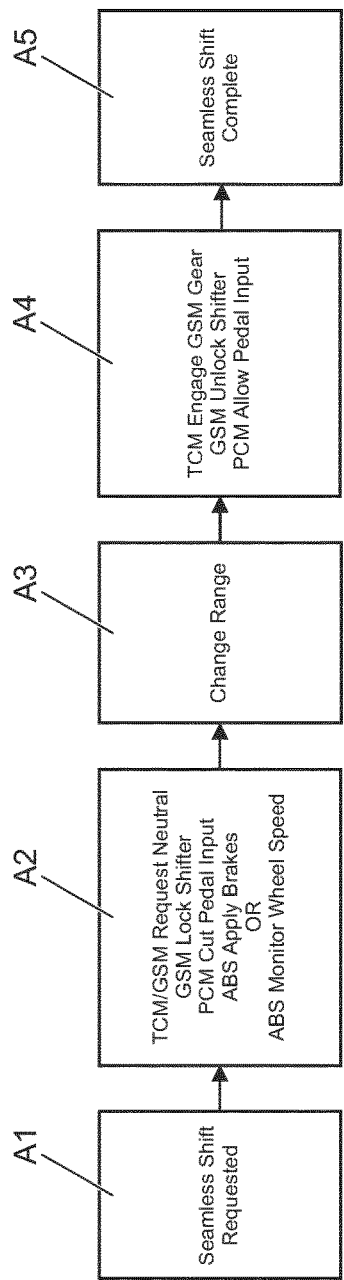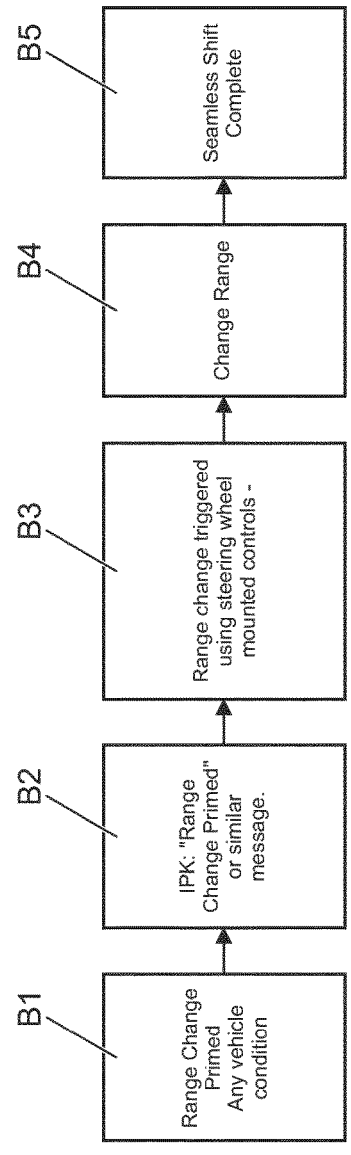
FIG. 2
FIG. 4

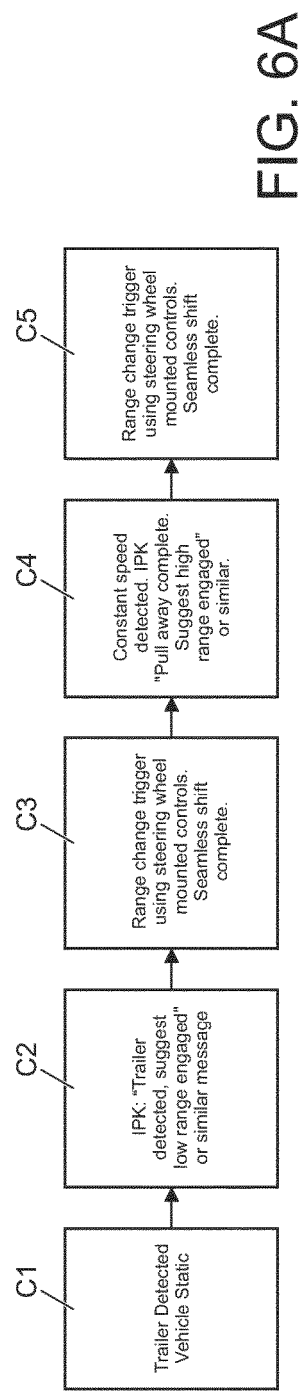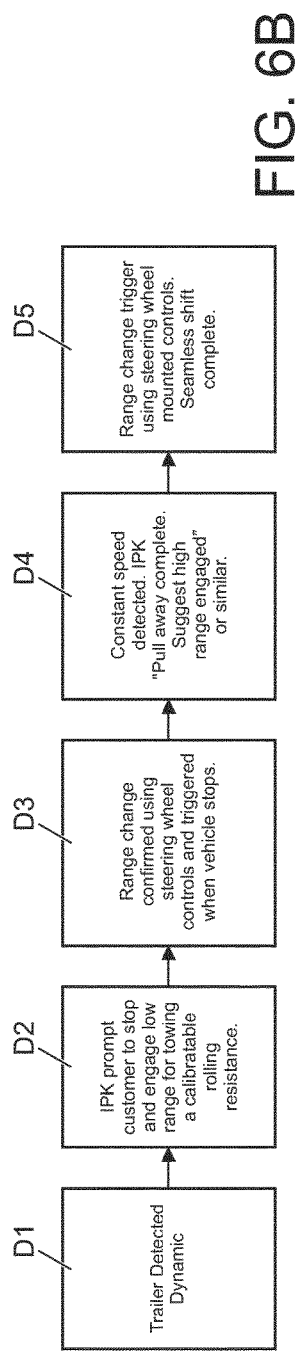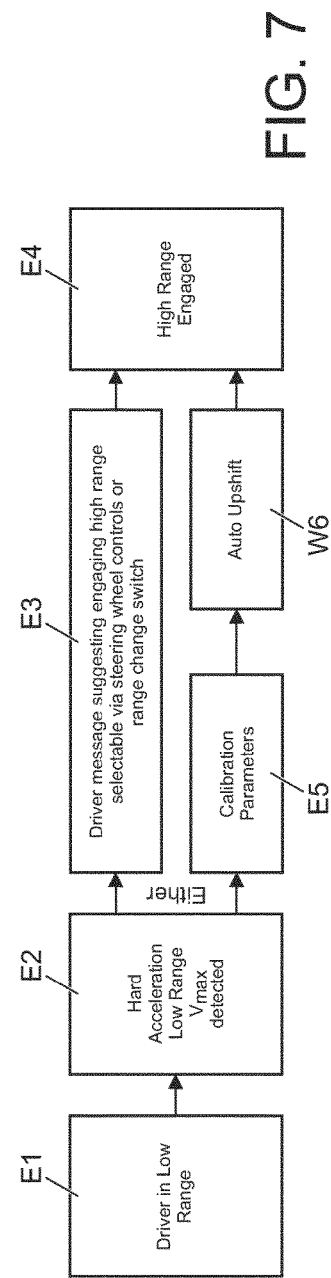

VEHICLE CONTROL SYSTEM AND METHOD

TECHNICAL FIELD

The present invention relates to a vehicle control system; a method of controlling a transfer case; and a vehicle.

BACKGROUND OF THE INVENTION

It is known to provide vehicles with a transfer case (also referred to as a reduction gearbox) to provide additional drive ranges. The transfer case is typically coupled to an output shaft from a transmission and, in a four-wheel drive vehicle, provides drive to the front and rear axles via front and rear propeller shafts. The torque delivered to the front and rear axles can be the same (i.e. 50:50 distribution) or different. The transfer case can also include a reduction gear set, for example a helical reduction or an epicyclic reduction gear set, to provide high and low drive ranges. The high range can provide a 1:1 ratio (i.e. direct drive) and the low range can provide a reduction gearing, for example 2.69:1.

The transfer case has particular application in off-road vehicles where the low range can increase the torque delivered at the wheels and provide improved low-speed control. High range should be used for all normal road driving and also for off-road driving across dry, level terrain. Low range should only be required where low speed manoeuvring is necessary, such as reversing a trailer, negotiating steep slippery surfaces or boulder strewn terrain. Low range should also be used for extreme off-road conditions where progress in high range cannot be maintained. Low range should not normally be used for normal road driving.

The transfer case can also include a synchroniser to enable dynamic range changes while the vehicle is travelling (referred to as shift-on-the-fly or shift-on-the-move control). By way of example, the transfer box can facilitate range changes when the vehicle is moving, within set limitations as follows:

High to Low—at speeds not exceeding 10 mph (16 km/h)
Low to High—at speeds not exceeding 30 mph (48 km/h).

If no synchroniser is fitted, static range changes are typically implemented with the vehicle stationary. The transfer case range changes from low to high are referred to herein as upshifts, and the transfer case range changes from high to low are referred to herein as downshifts. The transfer case can also be moved into a neutral position for towing the vehicle.

At least in certain embodiments the present invention attempts to overcome or ameliorate at least some of the limitations or problems associated with known transfer cases.

SUMMARY OF THE INVENTION

Aspects of the present invention relate to a vehicle control system; a method of controlling a transfer case; and a vehicle.

According to an aspect of the present invention there is provided a vehicle control system for controlling a vehicle transfer case operable in a high range and a low range; the vehicle control system being configured to output a range change signal to implement a transfer case range change; and a brake control signal for controlling vehicle braking during the range change. The brake control signal can control vehicle braking to control the vehicle speed, for example to maintain a vehicle speed or to hold the vehicle stationary. This has particular application during the range change as the vehicle transmission engages neutral. The brake control signal can be adapted to control an anti-lock brake system (ABS) on the vehicle. The brake control signal can be output directly to the ABS or to a communications network, such as a CAN bus, for transmittal to the ABS.

The vehicle control system can comprise a transfer case control module configured to output the range change signal and optionally also the brake control signal. Alternatively, the brake control signal can be output in dependence on said range change signal. For example, the brake control signal can be output by an antilock brake system (ABS) upon receipt of the range change signal.

The brake control signal can be operative to hold the vehicle stationary during the range change. This brake control strategy could be implemented for a transfer case which does not include a synchroniser since the vehicle should be stationary when the range change is performed. Alternatively, or in addition, this brake control strategy could be implemented if the vehicle is stationary when the range change is initiated and/or if the vehicle comes to rest during the range change. The control system can be configured to monitor the vehicle speed when the range change is initiated and/or during the range change. The brake control signal could, for example, activate a vehicle hill hold function. At least in certain embodiments the control system can be configured to maintain the hill hold function active even when the transmission is in neutral.

The brake control signal can be operative to control vehicle speed during the range change. The brake control signal can control the rate of deceleration of the vehicle. Alternatively, the brake control signal can operate to prevent an increase in the vehicle speed or to maintain the vehicle speed during the range change. For example, if the vehicle is on a slope, the brake control signal can operate to inhibit an increase in the vehicle speed when the vehicle transmission engages neutral.

The range change signal can comprise an upshift request to implement a transfer case range change from the low range to the high range; and/or a downshift request to implement a transfer case range change from the high range to the low range. The upshift request and/or the downshift request can require driver validation (confirmation) before the range change is implemented. For example, a display prompt or message can be generated in response to the range change signal and the upshift/downshift initiated only once the driver validates the suggested action. Alternatively, the upshift request and/or the downshift request can be output to the transfer case to implement the respective range changes. A combination of these semi-automated and automated control strategies could be implemented. Thus, the control system can implement autonomous or semi-autonomous transfer case range changes.

The control system can be configured to output a transmission control signal for controlling a vehicle transmission. The transmission control signal can comprise a neutral select request for engaging neutral in the vehicle transmission before said range change is initiated. The control system can be configured to check that the vehicle transmission is in neutral before outputting the transfer case control signal. The transmission control signal can comprise a gear select request for engaging a gear in the vehicle transmission after said range change has been completed. The control system can comprise a transmission control module configured to output said transmission control signal. The transmission control signal can be generated by the transmission control module in dependence on the range change signal.

The control system can be configured to monitor one or more vehicle operating parameters and to output said range change signal in dependence on said one or more vehicle operating parameters. This feature is believed to be independently patentable.

According to a further aspect of the present invention there is provided a vehicle control system for controlling a vehicle transfer case operable in a high range and a low range; wherein the vehicle control system is configured to:
 monitor one or more vehicle operating parameters; and
 output a range change signal for initiating a transfer case range change in dependence on said one or more vehicle operating parameters.

The control system can be in the form of a transfer case control module configured to output said range change signal.

The one or more vehicle operating parameters can comprise vehicle speed and/or vehicle acceleration. The control system can inhibit the output of an upshift request when the vehicle speed is greater than or equal to an upshift speed threshold; and/or vehicle acceleration is greater than or equal to a predefined acceleration threshold. The upshift speed threshold can be predefined. The upshift speed threshold can, for example, correspond to a maximum vehicle speed for the transfer case when operating in its low range. At least in certain embodiments, if the vehicle speed is greater than or equal to the upshift speed threshold, the control system can implement a control strategy to perform an automatic range change from the low range to the high range.

The control system can be configured to inhibit output of a downshift request when the vehicle speed is above a downshift speed threshold. The downshift speed threshold can be predefined. The control system can thereby inhibit range changes from the high range to the low range when the vehicle speed is above the second speed threshold. The vehicle speed can be monitored by a vehicle brake system. The vehicle brake system can be operative to hold the vehicle stationary or to control the vehicle speed in dependence on the range change signal. The control system can optionally be configured to output the range change signal to implement the downshift when the vehicle speed decreases below the downshift speed threshold or is within a predefined range.

The upshift speed threshold can be equal to or greater than the downshift speed threshold. For example, the upshift threshold can be 60 km/h and the downshift threshold can be 40 km/h.

The vehicle operating parameter(s) can comprise a torque request for determining a loading of the vehicle. The control system can determine the vehicle loading based on the torque request, for example combined with the vehicle speed and/or acceleration. Based on the loading, the control system can determine that the vehicle is travelling up or down an incline; and/or is towing a trailer. The control system can output a downshift request to implement a range change from the high range to the low range when the vehicle load is greater than or equal to a predefined load threshold.

The vehicle operating parameter(s) can comprise a rotational speed of an input shaft for the transfer case (which typically corresponds to the rotational speed of the output shaft from the transmission). The control system can be configured to inhibit the output of the range change signal when the vehicle is moving. The transfer case input shaft does not come to rest while the engine is operating due to transmission drag torque. The control system can be configured to inhibit the output of the range change signal when the rotational speed of the transfer case input shaft is above a predefined input shaft speed threshold and the output torque from the transmission is above a torque threshold. This control strategy can be implemented for a transfer case which does not include a synchroniser.

The vehicle operating parameter(s) can comprise engine speed. The control system can be configured to output a powertrain control signal to limit or control engine speed during the range change. The powertrain control signal can, for example, reduce the engine speed when the transmission engages neutral and during implementation of the transfer case range change. The powertrain control signal could define an engine operating speed limit as soon as the transmission enters neutral before a range change is implemented. The powertrain control signal could define an engine operating speed limit which is implemented or maintained during the range change. The powertrain control signal could automatically increase the engine speed, for example to match a torque request, when the range change is complete. The increase in the engine speed could be implemented incrementally or progressively.

At least in certain embodiments, the control system can implement different throttle maps for said high and low ranges.

The vehicle operating parameter(s) can comprise an operating mode of a centre differential, for example a Torsen® differential. The centre differential can lock to reduce wheel slip and increase traction. The control system can be configured to inhibit the output of said range change signal when the centre differential is locked. In an alternate embodiment, the control system can be configured to operate in conjunction with an electronic differential (for example controlling operation of the inboard and outboard brake systems) to inhibit the range change signal. Alternatively, the range change signal can be inhibited if a lateral acceleration of the vehicle exceeds a predefined threshold. The range change and clutch control can be inhibited during an ABS event to allow the ABS system full control over braking distribution across all of the vehicle wheels. The range change can be inhibited above a predefined lateral acceleration threshold. This control function can help avoid accidental implementation of a range change, for example in response to accidental operation of a selection switch.

The vehicle operating parameter(s) can comprise the operating range of the transfer case. If the transfer case is operating in said low range, the control system can be configured to output a range change signal comprising an upshift request. If the transfer case is operating in said high range, the control system can be configured to output a range change signal comprising a downshift request.

The range change signal can be output in response to a user range change request. The range change request can be generated by a range change selection means for receiving a user input. The selection means can, for example, be in the form of a button, switch, lever, touch screen, sensor or the like. Alternatively, or in addition, the range change request can be generated automatically by the control system. At least in certain embodiments, the control system can require user confirmation before initiating the range change in response to and automatically generated range change request.

The control system can be configured to output a transmission control signal for inhibiting engagement of a gear during the range change. The transmission control signal can control the vehicle transmission to inhibit engagement of a drive gear until the range change has been completed. The transmission control signal can thereby help to ensure that the transmission remains in neutral throughout the range change operation. The control system can be configured to output a selector control signal for locking or inhibiting a gear selection means. The gear selection means can comprise an actuator such as a switch, lever, button, or dial for controlling the vehicle transmission. The selector control signal can mechanically or electronically lock the gear selection means to inhibit user control of the vehicle transmission during the range change.

According to a still further aspect of the present invention there is provided a vehicle control system for controlling a vehicle transfer case operable in a high range and a low range; the vehicle control system being configured to monitor vehicle systems and to output a range change signal to implement a transfer case range change when the following conditions are satisfied:
a vehicle transmission is in neutral; and
a vehicle speed is within a predefined range or less than a predefined threshold.

The control system can require that the vehicle speed is zero (i.e. the vehicle is stationary) before outputting the range change signal. The control system can optionally be configured to implement the downshift when the vehicle speed decreases below the downshift speed threshold or is within a predefined range. A vehicle brake system can monitor the vehicle speed, for example based on data received from one or more wheel sensors. The control system can be in the form of a transfer case control module configured to output said range change signal.

In dependence on the range change signal, the vehicle brake system can subsequently control operation of the vehicle brakes to hold the vehicle stationary or to maintain the vehicle speed within the predefined range or below the predefined threshold.

The control system can also monitor one or more of the following operating parameters: incline, acceleration rate, vehicle wading status, or location information.

The control system can be configured to initiate the transfer case range change when a gear selection means is locked or inhibited; and/or when a vehicle brake system is operative to prevent increases in the vehicle speed.

The control system can be configured to output the range change signal when a rotational speed of an input shaft to the transfer case is below a predefined input shaft speed threshold. The input shaft speed threshold can, for example, be 100 rpm, 200 rpm or 300 rpm. The synchroniser synchronises the transfer case with the road speed, hence increasing the rotational speed of the transfer case and the transmission output shaft. When the vehicle is put back into drive, the synchronizer can then engage the torque converter to synchronise the transmission and driveline with the engine speed.

The vehicle control system described herein can be implemented in a transfer case controller. Alternatively, the vehicle control system can be implemented across an electronic control system comprising a plurality of vehicle control modules. For example, a vehicle ABS module can be configured to generate the brake control signal in dependence on a range change signal; and/or an engine control module can be configured to generate the powertrain control signal in dependence on a range change signal. The range change signal can be published to a communications network by the range change selection means or a transfer case controller.

According to a yet further aspect of the present invention there is provided a vehicle incorporating a vehicle control system as described herein.

According to a further aspect of the present invention there is provided a method of controlling a vehicle transfer case operable in a high range and a low range; the method comprising:
outputting a range change signal to implement a transfer case range change, and;
producing a brake control signal for controlling vehicle braking during the range change.

The brake control signal can be operative to hold the vehicle stationary during the range change; and/or to control vehicle speed during the range change.

The method can comprise outputting a transmission control signal for controlling a vehicle transmission. The transmission control signal can comprise a neutral select request for engaging neutral in the vehicle transmission before said range change is initiated. The transmission control signal can comprise a gear select request for engaging a gear in the vehicle transmission after said range change has been completed.

The method can comprise monitoring one or more vehicle operating parameters and outputting said range change signal in dependence on said one or more vehicle operating parameters. This control strategy is believed to be patentable independently.

According to a still further aspect of the present invention there is provided a method of controlling a vehicle transfer case operable in a high range and a low range; wherein the method comprises:
monitoring one or more vehicle operating parameters; and
outputting a range change signal for initiating a transfer case range change in dependence on said one or more vehicle operating parameters.

The vehicle operating parameter(s) can comprise vehicle speed and/or vehicle acceleration. The range change signal can comprise an upshift request to implement a range change from the low range to the high range when said vehicle speed is greater than or equal to an upshift speed threshold; and/or the vehicle acceleration is greater than or equal to an acceleration threshold. The upshift speed threshold and/or the acceleration threshold can be predefined.

The method can comprise inhibiting output of a downshift request when the vehicle speed is above a downshift speed threshold. The downshift speed threshold can be the same as the upshift speed threshold. Alternatively, the downshift speed threshold can be less than the upshift speed threshold. For example, the upshift threshold can be 60 km/h and the downshift threshold can be 40 km/h.

The vehicle operating parameter(s) can comprise a torque request. The method can include determining a loading of the vehicle based on said torque request. For example, the loading can be determined based on the vehicle speed and/or acceleration for a given torque request. The vehicle loading can provide an indication that the vehicle is operating on an incline (either ascending or descending); and/or if a trailer is coupled to the vehicle. The range change signal can comprise a downshift request to implement a range change from the high range to the low range when the vehicle loading is greater than or equal to a predefined load threshold. The downshift request can be transmitted directly to the transfer case; or can be output to the driver for confirmation to proceed with the range change.

The vehicle operating parameter(s) can comprise a rotational speed of an input shaft for the transfer case. The method can comprise inhibiting the output of the range change signal when the rotational speed of the input shaft is below a predefined input shaft speed threshold. This control sequence is appropriate if the transfer case does not have a synchroniser or the rotational speed of the input shaft is greater than an operating threshold of the transfer case.

The vehicle operating parameter(s) can comprise engine speed. The method can comprise outputting a powertrain control signal to limit or control engine speed during the range change. The method could comprise inhibiting output of the range change control signal when the engine speed is above a predefined engine speed threshold.

The vehicle operating parameter(s) can comprise the operating range of the transfer case. Thus, the method can comprise determining if the transfer case is currently operating in a high range or a low range. The method can comprise outputting a range change signal comprising an upshift request to implement a range change from the low range to the high range when the transfer case is operating in said low range. Conversely, the method can comprise outputting a range change signal comprising a downshift request to implement a range change from the high range to the low range when the transfer case is operating in said high range.

The range change signal can be output in response to a range change request. The range change request can be generated automatically or in response to a user input, for example in dependence on actuation of a range change selection means. The range change selection means can be in the form of a button, a switch, a touch screen or other human machine interface (HMI).

The method can comprise outputting a transmission control signal for inhibiting engagement of a gear during the range change. Alternatively, or in addition, the method can comprise outputting a selector control signal for locking or inhibiting a gear selection means.

According to a yet further aspect of the present invention there is provided a method of controlling a vehicle transfer case operable in a high range and a low range; the method comprising outputting a range change signal to implement a transfer case range change when the following operating conditions are satisfied:
 a vehicle transmission is in neutral; and
 a vehicle speed is within a predefined range or less than a predefined threshold.

The method can comprise monitoring vehicle speed, for example utilising one or more speed sensors in a vehicle brake system. The method can comprise controlling a vehicle brake system to hold the vehicle stationary or to control the vehicle speed while the range change is implemented.

The vehicle control system described herein can take the form of a control apparatus, for example comprising one or more control modules. The control modules can each contain one or more processors which can function independently of each other or in parallel. The control modules can be disposed in a system architecture, for example communicating with each other over a network.

The methods described herein can be computer-implemented, for example on a computational apparatus comprising one or more microprocessors. According to a yet further aspect of the present invention there is provided a computer program product comprising a computer readable storage medium including computer readable program code, where the computer readable program code when executed on a computer causes the computer to perform the method(s) described herein.

The term processor used herein is to be understood as covering both single processors and multiple processors. For example, the processing steps described herein could be performed by a single processor; or could be performed by separate processors. The processors could, for example, be provided in different control modules making up a vehicle control system. Thus, the vehicle control system can be integrated into a vehicle systems architecture incorporating one or more control modules in communication with each other over a network. The control modules could, for example, comprise one or more of the following: a transfer case control module, a transmission control module, an ABS module, a powertrain control module, a gear selector module, an instrument pack control module, and an advanced terrain control module.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which:

FIG. 2 shows a first block diagram illustrating operation of the vehicle control system;

FIG. 4 shows a second block diagram illustrating operation of the vehicle control system in dependence on a trigger event;

FIGS. 6A and 6B show respective third and fourth block diagrams illustrating operation of the vehicle control system when a trailer is detected;

FIG. 7 shows a fifth block diagram illustrating operation of the vehicle control system in dependence on vehicle speed and acceleration;

DETAILED DESCRIPTION OF AN EMBODIMENT

A vehicle control system 1 incorporating a transfer case control module (TCCM) 2 in accordance with an embodiment of the present invention is described herein with reference to the accompanying Figures. The TCCM 2 is operable to control a transfer case 3 of a vehicle 5 to change between high and low ranges.

Figure 1:
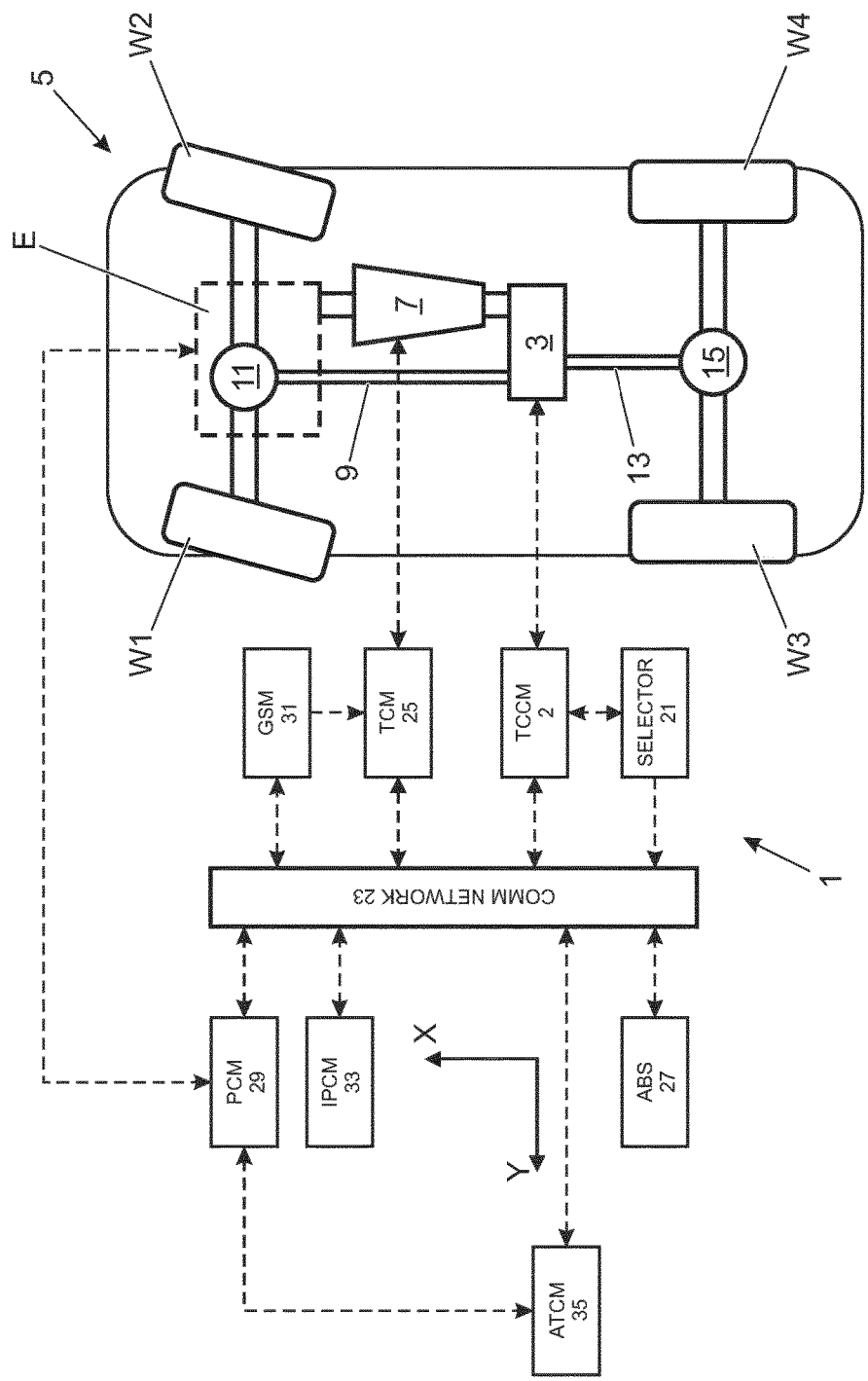
FIG. 1 shows a schematic representation of a vehicle incorporating a vehicle control system in accordance with an embodiment of the present invention.

With reference to FIG. 1, the TCCM 2 and the transfer case 3 are installed in the vehicle 5. The vehicle 5 has two front wheels W1, W2 and two rear wheels W3, W4 and a drive torque can be selectively delivered to each of the wheels W1-4 (i.e. the vehicle has four wheel drive 4WD).

An internal combustion engine E (shown in phantom in FIG. 1) is provided for delivering torque to the wheels W1-4. The invention can also be implemented in a vehicle 5 utilising one or more electric machines to drive the wheels W1-4, for example a hybrid electric vehicle (HEV) or an electric vehicle (EV). The present invention could be applied in other All-Wheel Drive (AWD) vehicles, for example vehicles comprising six wheels.

The transfer case 3 is mounted to a transmission 7 in the vehicle 5. The transfer case 3 enables a transfer of drive from a single transmission output to a twin output to deliver torque to the front wheels W1, W2 via a front drive (propeller) shaft 9 and front differential 11, and to the rear wheels W3, W4 via a rear drive (propeller) shaft 13 and rear differential 15. The transfer case 3 comprises a centre differential to allow a speed difference across the front and rear drive shafts 9, 13. In order to aid off road traction, the transfer case 3 comprises a reduction gear set to provide a twin speed transfer case 3 selectively operable in a high range (direct drive) and a low range (reduction drive). The transfer case 3 comprises a servo actuator, such as an electromagnetic machine, for changing between the high range and the low range. The operation of the servo actuator is controlled by the TCCM 2. The servo actuator can be disposed inside the transfer case 3 or externally of the transfer case 3.

The transfer case 3 can optionally comprise a synchroniser to allow a dynamic change between said high and low ranges. The synchroniser allows the transfer case 3 to complete shifts between the high and low ranges (both from the high range to the low range and vice versa) whilst the vehicle 5 is moving (referred to as shift-on-the-fly or shift-on-the-move control), thereby avoiding the need for the driver to stop the vehicle 5 to complete the range change. The synchroniser matches the rotational speed of the output from the transfer case 3 with the internal rotational speed of the transfer case 3. The transfer case 3 is directly coupled to the front and rear drive shafts 9, 13 and, therefore, is determined by the vehicle (road) speed. The rotational speed of an input shaft for the transfer case 3 should be as close to zero as possible to allow the transfer case 3 to synchronise with the transmission 7 (approximate zero velocity difference). The transmission 7 must select neutral to allow the speed of the input shaft to the transfer case to decrease sufficiently before the transfer case 3 shifts between said high and low ranges. For example, the range change can be performed when the input shaft speed is approximately 100 rpm. The synchroniser can then increase the rotational speed of the transfer case 3 to match the vehicle speed so the transfer case 3 and the output shaft from the transmission 7 are rotating at the vehicle speed. The shift to "drive" and re-engagement of gear is then handled by a torque converter in terms of engine speed synchronisation to vehicle speed.

In prior art arrangements, the driver must first engage neutral in the transmission 7 before changing between high and low transfer case ranges. If the transfer case 3 does not include a synchroniser, only static changes can be performed. In other words, the vehicle 5 must be stopped before the transfer case 3 can change between said high and low ranges. The present invention has applications in transfer cases 3 either with or without a synchroniser and the control strategies implemented to perform static and dynamic shifts are described herein. At least in certain embodiments, the vehicle control system 1 can implement an autonomous or semi-autonomous transfer case range change.

A range change selector 21 is provided to enable the driver to request a range change. When activated, the range change selector 21 generates a range change request signal which is published to a vehicle communication network 23. In the present embodiment, the range change selector 21 comprises selection means in the form of a button which can be depressed by the driver to select a range change. It will be appreciated that the selection means could take other forms, such as a switch, a lever, a capacitance sensor, or a virtual selector displayed on a touchscreen interface. In the present embodiment the selection means also comprise a set of steering wheel controls which provide duplicate controls. The steering wheel controls allow the driver to implement a range change without taking their hands off the steering wheel. Alternatively, or in addition, the selection means could be disposed on the dashboard or centre console.

The TCCM 2 receives data signals from other on-board electronic modules over the vehicle communications network 23. In particular, the TCCM 2 is configured to receive vehicle operating parameters indicating the dynamic status of the vehicle and its various systems. The TCCM 2 communicates with the other modules over the communications network 23 to implement a control strategy for implementing a transfer case range change. The TCCM 2 receives data from, and publishes data to the communication network 23. The TCCM 2 can, for example, publish one or more of the following network signals to the communication network 23:

(a) a change notification signal for indicating that a range change has been requested, for example in dependence on receipt of the range change request;
(b) a change identification signal for indicating that the attempted range change is a static change or a dynamic change;
(c) a change initialisation signal for initialising the range change; and
(d) a range change completion signal for indicating that the range change has been completed; or
(e) any other state which may require a different reaction from other modules on the vehicle 5.

The TCCM 2 accesses vehicle operating parameter(s) over the communication network 23 to determine the current status of vehicle systems and/or the dynamic operating parameters of the vehicle 5. For example, the TCCM 2 accesses vehicle speed data and modifies the change identification signal to indicate whether the attempted range change is static or dynamic. If the transfer case 3 does not include a synchronizer, the TCCM 2 determines that the range change is not viable if the vehicle 5 is moving and outputs a notification to the instrument pack control module 33 to inform the driver that the requested range change is not possible, optionally also indicating that the vehicle 5 should be brought to rest. Equally, if the transfer case 3 comprises a synchronizer but the TCCM 2 determines that the vehicle speed is above a predefined range change threshold, a notification is output to the instrument pack control module 33 to inform the driver that the requested range change is not possible, optionally also indicating that the vehicle 5 should be slowed.

The vehicle modules which operate to implement a successful range change include:
- a transmission control module (TCM) 25 for controlling the transmission 7;
- an anti-lock braking system (ABS) control module 27 for controlling the front and rear friction brakes;
- a powertrain control module (PCM) 29 for controlling the powertrain;
- a gear selector module (GSM) 31 for controlling driver selection of gears;

an instrument pack control module (IPCM) 33 for controlling the output of information to the driver;

an advanced terrain control module (ATCM) 35 for controlling dynamic operating parameters of the vehicle 5.

The control strategy implemented by the TCCM 2 is illustrated in a first block diagram in FIG. 2. A range change request signal is received from the range change selector 21 in response to a driver request (A1). Upon receive of the range change request signal over the communications network 23, the TCM 25 and/or the GSM 31 request neutral in the transmission 7; the GSM 31 inhibits gear selection; the PCM 29 inhibits throttle pedal input; and the ABS control module 27 applies the brakes and/or controls wheel speed (A2). The transfer case 3 then performs the range change (A3). The TCM 25 engages an appropriate gear; the GSM 31 permits gear selection; and the PCM 29 enables throttle pedal inputs (A4). The range change is then complete (A5).

At least in certain embodiments, the TCCM 2 is operative to reduce the driver input to implement a range change through implementing certain conditions when the range change selector 21 is activated. As described herein, upon receipt of the range change request signal over the communications network 23, the TCCM 2 will check vehicle operating parameters to determine if a range change is viable. If the parameters comply with predefined conditions, the TCCM 2 will output the change notification signal to indicate that the range change has been requested. The GSM 31 comprises a selector, such as a gear lever, paddle(s) or a rotary dial, for selection of gears in the transmission by the driver. The GSM 31 could be provided with duplicate controls, for example steering wheel mounted paddles together with a lever.

Figure 3:
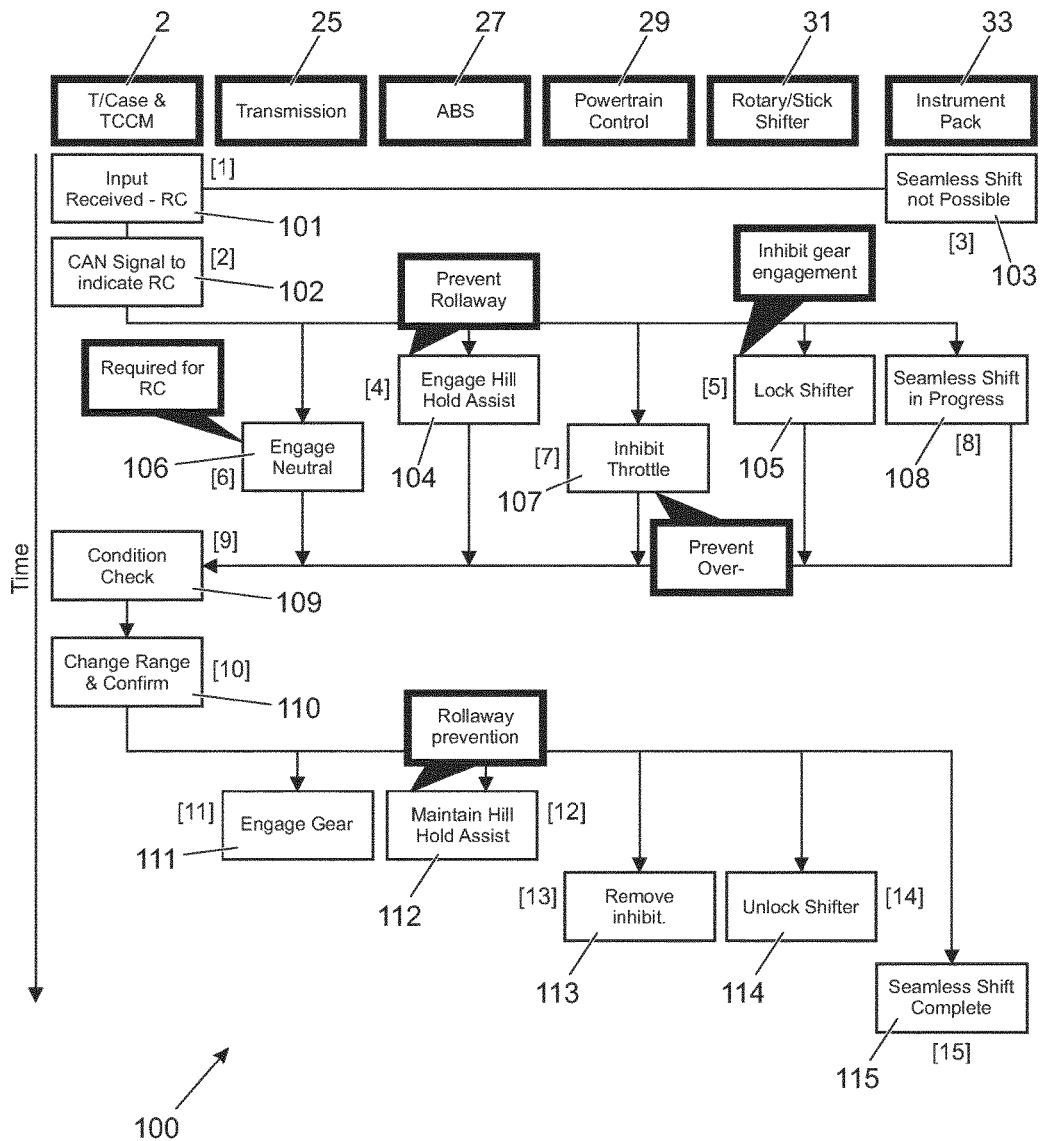
FIG. 3 shows a first flow chart showing implementation of the control strategy illustrated in FIG. 2.

The electronic modules are configured to control the associated systems based on the network signal(s) output from the TCCM 2. Upon receipt of the change notification signal, the relevant vehicle modules are operative to perform a sequence of events to allow the transfer case 3 to perform the range change successfully. As illustrated in FIG. 3, when the change notification signal is received over the communications network 23, the electronic modules implement the following control strategy:
  a. The TCM 25 controls the transmission 7 to engage neutral [STEP 6] which is a requirement for range change.
  b. The ABS control module 27 engages the vehicle brakes or control wheel speed [STEP 4] to prevent vehicle rollaway.
  c. The PCM 29 inhibits throttle input [STEP 7].
  d. The GSM 31 locks or inhibits shifting [STEP 5].
  e. The IPCM 33 outputs a driver notification indicating the status of the range change [STEP 8].

Only once these steps have been successfully completed does the TCCM 2 execute the range change. The control strategy ensures that the events are performed in a timed order to eliminate the chances of the vehicle operating in an unexpected manner, for example rolling away during the range change. The static shift strategy is implemented for all range changes performed by a transfer case 3 which does not have a synchroniser; and also for a transfer case 3 having a synchroniser when the vehicle 5 is stationary. The control strategy will now be described in more detail for both static and dynamic shifts.

Static Shifting (Vehicle Stationary)

The control strategy for implementing a static range change will now be described with reference to a first flow chart 100 shown in FIG. 3. The control strategy is the same irrespective of whether the range change is from a low range to a high range or vice versa.
  i. The TCCM 2 receives a range change request from the range change selector 21 [STEP 1]. The TCCM 2 assesses whether the current vehicle state is suitable to perform a range change. If the vehicle 5 is not in a suitable state, for example the vehicle 5 is moving, the IPCM 33 outputs a message [STEP 3] for display on the instrument cluster advising the driver that the range change cannot be performed. If the TCCM 2 determines that a range change is possible, the change notification signal is output to the communications network 23. In practice, the change notification signal is generated by changing the value of a communications signal [STEP 2] to indicate that the vehicle is completing a static range change.
  ii. The ABS Module 27 receives the change notification signal over the communication network 23 and engages a hill hold function [STEP 4] to prevent the vehicle 5 from rolling away during the range change, for example when neutral is selected in the transmission 7. The ABS module 27 then publishes a hill hold notification to the communication network 23.
  iii. Upon receipt of the change notification signal, the GSM 31 locks the gear selector [STEP 5], either mechanically or through software, to prevent the driver from engaging a gear in the transmission 7 during the range change. The GSM 31 publishes a gear selector locked notification to the communication network 23. The GSM 31 can lock the gear selector at the same time as the ABS module 27 engages the hill hold function [STEP 4].
  iv. Upon receipt of the change notification signal and the gear selector locked notification, the TCM 25 engages neutral [STEP 6]. The TCM 25 publishes a neutral engaged notification to the communication network 23.
  v. Upon receipt of the change notification signal and the neutral engaged notification, the PCM 29 inhibits throttle inputs [STEP 7].
  vi. The TCCM 2 performs a check across all electronic modules to ensure that the preconditions for a range change are satisfied [STEP 9]. Provided the preconditions are satisfied, the TCCM 2 completes the range change shift [STEP 10] by outputting a control signal to control operation of the servo motor in the transfer case 3. The TCCM 2 also outputs the initialisation signal to the communications network 3.
  vii. The TCCM 2 outputs the range change completion signal once the range change has been completed. In dependence on the range change completion signal, the TCM 25 will then engage the correct gear for the new range, or revert back to the state it was in before the range change shift was initiated [STEP 11].
  viii. As a safety feature, the ABS module 27 does not remove the hill hold assist, thereby ensuring that the vehicle does not roll away once the range change has been completed [STEP 12].
  ix. Upon receipt of the range change completion signal, the PCM 29 will remove the throttle inhibit [STEP 13].
  x. Upon receipt of the range change completion signal, the GSM 31 will unlock the shifter [STEP 14].
  xi. The IPCM 33 outputs a notification signal to display a message on the instrument cluster informing the driver that the requested range change has completed, and inform them of the new selected range [STEP 15].

The ABS module 27 removes the hill hold assist when the throttle pedal is depressed by the driver.

Dynamic Shift (Vehicle Moving)

The control strategy for implementing a dynamic range change will now be described. The control strategy is the same irrespective of whether the range change is from a low range to a high range or vice versa.

i. The TCCM 2 receives a range change request from the range change selector 21 [STEP 1]. The TCCM 2 determines whether the current vehicle state is suitable for a range change. If the vehicle 5 is not in a suitable state, for example the vehicle speed is above a low range operating threshold, the IPCM 33 outputs a message [STEP 3] for display on the instrument cluster advising the driver that the range change cannot be performed. If the TCCM 2 determines that a range change is possible, the change notification signal is output to the communications network 23. In practice, the change notification signal is generated by changing the value of a communications signal [STEP 2] to indicate that the vehicle is completing a dynamic range change.

ii. The ABS Module 27 receives the change notification signal over the communication network 23 and engages a control strategy to prevent the vehicle 5 from accelerating [STEP 4].

iii. Upon receipt of the change notification signal and confirmation that acceleration is inhibited, the GSM 31 locks the gear selector (shifter) [STEP 5], either mechanically or through software, to prevent the driver from engaging a gear in the transmission 7 during the range change. The GSM 31 then publishes a gear selector locked notification to the communication network 23.

iv. Upon receipt of the change notification signal and the gear selector locked notification, the TCM 25 engages neutral [STEP 6]. The TCM 25 then publishes a neutral engaged notification to the communication network 23.

v. Upon receipt of the change notification signal and the neutral engaged notification, the PCM 29 inhibits any throttle inputs [STEP 7].

vi. The TCCM 2 performs a check across all modules to ensure that the preconditions for a range change are satisfied. Provided the preconditions are satisfied, the TCCM 2 completes the range change shift [STEP 9 & 10] by outputting a control signal to control operation of the servo motor in the transfer case 3. The TCCM 2 also outputs the initialisation signal to the communications network 3.

vii. The TCCM 2 outputs the range change completion signal once the range change has been completed. In dependence on the range change completion signal, the TCM 25 will then engage the correct gear for the new range, or revert back to the state it was in before the range change shift was initiated [STEP 11].

viii. The ABS module 27 continues to control wheel speed until the driver intervenes with either throttle or brake pedal input [STEP 12].

ix. Upon receipt of the range change completion signal, the PCM 29 will remove the throttle inhibit [STEP 13].

x. Upon receipt of the range change completion signal, the GSM 31 will unlock the shifter [STEP 14].

xi. The IPCM 33 outputs a notification signal to display a message on the instrument cluster informing the driver that the requested range change has completed, and inform them of the new selected range [STEP 15].

In the event that the vehicle 5 comes to a standstill during a dynamic range change, the communications signal previously indicating a dynamic shift would change value to reflect that the static shift strategy should be implemented to secure the vehicle and prevent it rolling away.

The transfer case range changes can be inhibited under certain circumstances to prevent the car becoming stranded or to prevent the vehicle rolling away or losing control. For example, dynamic shifts can be inhibited during wading to prevent the vehicle rolling to a stop mid-wade and thus destroying the bow wave which may be preventing water ingress to the air inlet. Moreover, dynamic shifts can be inhibited when the brake temperature is high (for example at high speeds and/or descending a gradient) since the application of the brakes by the ABS module 27 could potentially cause an overheat scenario. The dynamic shifts can be inhibited where the differential is locked (for example above a calibratable limit) in order to prevent loss of stability and/or unintended noise vibration harshness (NVH) effects through the vehicle driveline.

Stored Request for Range Change & Long Press Functionality

The TCCM 2 in combination with the range change selector 21 can provide additional control functionality, for example to control the timing and/or the trigger events to initiate a range change. At least in certain embodiments, the driver can prime the range change selector 21 to trigger the range change through a separate control medium. The TCCM 2 can, for example, be configured to implement the range change after a defined time period has elapsed or when one or more vehicle dynamic parameters are satisfied.

This control strategy can be implemented in conjunction with, or independently of the general control strategy described herein with reference to FIGS. 2 and 3. The operating mode can be implemented in the vehicle 5 having the capability to engage a new range without a customer intervention (i.e. automatically). The range change selector 21 can operate to provide primary and secondary functions. The different sequence of events implemented by the primary and secondary functions is specific to the current operating range of the transfer case, such that the TCCM 2 reacts differently if the transfer case 3 is currently in the high range or the low range. Alternatively, or in addition, the TCCM 2 can be primed to initiate the transfer case range change in dependence on an alternative trigger.

The control strategy implemented to perform a range change after the TCCM 2 has been primed is illustrated in a second block diagram shown in FIG. 4. The TCCM 2 is primed to perform a range change (B1); and a driver prompt is output to the IPCM 33, for example to display the message "Range Change Primed" (B2). The range change can subsequently be triggered by the driver operating steering wheel mounted controls (B3). The transfer case 3 performs the range change (B4) in response to the driver request; and the range change is complete (A5).

In the present embodiment, the primary and secondary functions are selected based on the period of time for which the button is depressed (the "press time"). The press time is monitored by the TCCM 2 and different control strategies are implemented based on the detected press time. In particular, the press time is compared to a predefined first time period which can be calibrated, for example to 1 second, 2 seconds, 3 seconds or longer. If the press time is less than the first time period, the primary function is selected. If the press time is longer than the first time period, the secondary function is selected. A separate cancel function can be provided, for example on a steering wheel control. The range change selector 21 could optionally be configured to cancel the primary and secondary functions if the button is depressed for a time period longer than a predefined maximum time period. To avoid accidental operation (for example, due to an object in the vehicle falling on the range change selector 21), the range change selector 21 could optionally be configured to select the primary function only if the button is depressed for a time period longer than a minimum time period.

The primary function comprises initiating the range change based on the control strategy described herein with reference to FIG. 3. The secondary function comprises priming the TCCM 2 ready to initiate the range change when one or more specified criteria are satisfied. When the secondary function is selected, the vehicle human machine interface (HMI) can display a "primed" status signal (for example on the IPCM 33) and a low range selection light could optionally flash intermittently. The range change selector 21 can optionally be configured automatically to cancel the secondary functions if the specified criteria are not satisfied within a predefined time period.

The primary function implements a control strategy to implement a range change without undue delay (subject to the required vehicle operating parameters being satisfied). Specifically, the TCCM 2 checks the status of the vehicle 5 by accessing the data published to the communications network 23 and, provided the vehicle 5 is in a suitable state (as described herein), outputs a change notification signal to the communications network 23.

Figure 5:
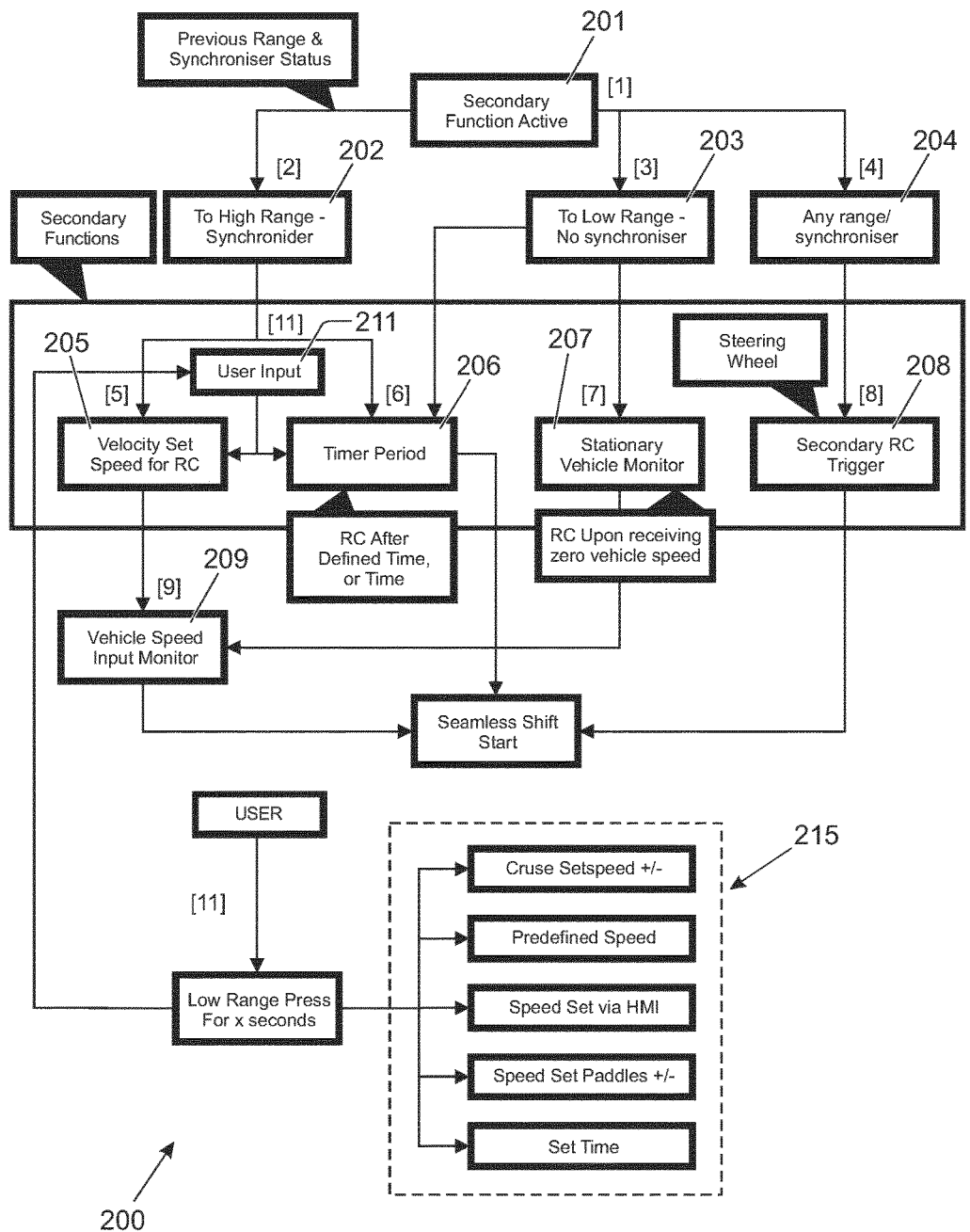
FIG. 5 shows a second flow chart showing implementation of the control strategy illustrated in FIG. 4.

With reference to the second flow chart 200 shown in FIG. 5, the secondary function comprises priming the TCCM 2 ready to implement the range change [STEP 201]. The control strategy implemented by the secondary function depends on the current operating range of the transfer case, i.e. whether the transfer case is in a high range [STEP 203] or in a low range [STEP 202]. The secondary function can comprise initiating the range change after a predefined time period has elapsed [STEP 206]; and/or when the vehicle speed is above/below a defined speed threshold [STEP 205]. Alternatively, a range change can be triggered in high or low ranges, either with or without a synchroniser [STEP 204]. In this arrangement, the driver can implement the range change using a secondary input means, for example in the form of steering wheel controls [STEP 208]. The various control strategies are described below for a transfer case 3 with and without a synchroniser.

The primary and secondary functions could be selected using different techniques. For example, the range change selector 21 could comprise separate selection means for the respective primary and second functions. For example, the range change selector 21 could comprise first and second buttons or switches for selecting the respective primary and secondary functions. Alternatively, the primary and secondary functions could be selected based on the displacement or travel of a selection means, or the actuating force applied by the user. A further alternative would be to select the secondary functions if the driver requests a range change, but the predefined operating conditions have not been satisfied and the range change selector 21 determines that the range change cannot be implemented.

Vehicle Operating in High Range

If the transfer case 3 does not have a synchroniser to low range (requiring static range changes with the vehicle stationary), the secondary function comprises:
1. Implementing a time latch to allow the vehicle 5 to change range automatically if the vehicle 5 satisfies the speed requirement (i.e. the vehicle comes to rest) within a defined period of time [STEP 206]. The period of time can be calibratable, for example by the driver (through the HMI) or can be predefined (for example by the original equipment manufacturer OEM).
2. Implementing a permanent latch [STEP 207] such that the vehicle will stay in a primed state for changing range upon satisfying the speed requirement (i.e. the TCCM 2 determines that the vehicle speed is zero) at any point in time until the range change is executed. The latch could be cancelled or removed, for example by repeating the selection process.

If the transfer case has a synchroniser to low range (permitting "shift-on-the-fly" dynamic range changes), the secondary function comprises:
1. Implementing a time latch [STEP 206] such that the vehicle will change range automatically after a set period of time. The period of time could be calibratable, for example by the driver (through the HMI), or can be predefined (for example by the OEM) and optionally output to the IPCM 33 for display.
2. Implementing a speed latch [STEP 205] such that the vehicle will change range once a set speed has been ascertained. This speed could be configurable via the HMI [STEP 211]. In particular, the driver can define the set speed using vehicle±cruise control selectors; the HMI; dedicated speed set±controls [STEP 215]. A transition from a low range to a high range could be implemented when the vehicle speed is equal to or greater than a first (upshift) speed threshold; and a transition from a high range to a low range could be implemented when the vehicle speed is equal to or less than a second speed threshold. The first speed threshold can be less that the second speed threshold. For example, the first speed threshold can be 30 mph and the second speed threshold can be 50 mph. The first and second speed thresholds can optionally be predefined by the OEM, or could be defined by the user.

Vehicle Operating in Low Range

If the transfer case does not have a synchroniser to high range (requiring static range changes with the vehicle stationary), the secondary function comprises:
1. Implementing a time latch to allow the vehicle to change range automatically if the vehicle satisfies the speed requirement (i.e. the vehicle comes to rest) within a defined period of time. The period of time can be calibratable, for example by the driver (through the HMI), or can be predefined (for example by the OEM).
2. Implementing a permanent latch [STEP 207] such that the vehicle will stay in a primed state for changing range upon satisfying the speed requirement at any point in time until the range change is executed. The latch could be cancelled or removed, for example by repeating the selection process.

If the transfer case has a synchroniser to high range (permitting "shift-on-the-fly" dynamic range changes), the secondary function comprises:
1. Implementing a time latch [STEP 206] such that the vehicle will change range automatically after a set period of time. The period of time could be calibratable, for example by the driver (through the HMI), or can be predefined (for example by the OEM) and optionally output to the IPCM 33 for display.
2. Implementing a speed latch [STEP 205] such that the vehicle will change range once a set speed has been ascertained. This speed could be configurable via the HMI [STEP 211], for example using the steering wheel mounted control for setting a cruise control set speed and/or automatic speed limiter set speed.

The TCCM 2 outputs the control signal to control the transfer case 3 to implement the requested range change once the relevant criteria are satisfied [STEP 213]. The TCCM 2 can implement the range change without further input from the driver when the relevant criteria are satisfied. Alternatively, when the relevant criteria are satisfied, the TCCM 2 can output a prompt seeking confirmation from the driver that the range change is to be implemented.

The primary and secondary functions could be selected based on the period of time for which an actuator is held in a predefined position, for example against a stop. The primary function could be selected by displacing the actuator to the predefined position; and the secondary function could be selected by holding the actuator in said predefined position for a time period longer than the first time period described herein. The actuator could be spring-biased away from the predefined position, for example to a neutral position. The actuator could, for example, be a lever, a switch or a rotary knob.

It will be appreciated that, at least in certain embodiments, the range change selector 21 can enable both the primary and secondary functions to be selected using a single selection device, such as a button. This dual function could optionally be supplemented with a further control device, such as a touchscreen, a touch-panel or a rotary selector, to provide additional control functions. For example, the range change selector 21 could be configured to activate a control screen to calibrate related functionality. For example, the control screen could allow the locking torque of a differential to be adjusted. A slider displayed onscreen (or other soft input device) could be used to adjust the locking torque. This function is believed to be patentable independently of the other techniques described herein.

Trailer Tow Mode Interface & Hill Climb Assist

The TCCM 2 can operate to provide trailer towing and/or hill climb assist functionality. At least in certain embodiments, this operating mode can improve the driver's control when setting off with a trailer coupled to the vehicle 5 or when travelling up an incline. A trailer connected signal is published to the communications network 23 when a trailer socket is connected to the vehicle. The TCCM 2 checks the trailer connected signal and, upon determining that a trailer has been connected, generates a driver prompt to engage the transfer case low range. The driver prompt is published to the communications network 23 and can be displayed on the IPCM 33, for example. The driver can accept or dismiss the recommendation, for example by operating the range change selector 21 or steering wheel controls. Conversely, when the trailer is removed, the TCCM 2 can output a recommendation to engage the transfer case high range. The recommendation could again be published to the communications network 23 for display on the IPCM 33.

The control strategy implemented by the TCCM 2 when the vehicle 5 is static is illustrated in a third block diagram shown in FIG. 6A. The TCCM 2 detects a trailer connected signal over the communications network indicating that a trailer is connected to the vehicle 5 (C1). The TCCM 2 outputs a driver prompt to the IPCM 33, for example to display the message "Trailer detected, suggest low range engage" (C2). The driver can then implement the range change from high to low using the range selector means 21, for example disposed on the steering wheel (C3). The TCCM 2 continues to monitor the vehicle speed and once a constant speed has been detected, a driver prompt is output to the IPCM 33, for example to display the message "Pull away complete. Suggest high range engaged." (C4). The driver can then implement the transfer case range change from low to high using the range selector means 21 (C5).

The control strategy implemented by the TCCM 2 when the vehicle 5 is moving is illustrated in a fourth block diagram shown in FIG. 6B. The TCCM 2 detects a trailer connected signal over the communications network indicating that a trailer is connected to the vehicle 5 (D1). The TCCM 2 outputs a driver prompt suggesting that the driver stop and engage low range for towing a calibratable rolling resistance (D2). The driver can then implement the range change from high to low using the range selector means 21, for example disposed on the steering wheel, when the vehicle 5 has stopped (D3). The TCCM 2 continues to monitor the vehicle speed and once a constant speed has been detected, a driver prompt is output to the IPCM 33, for example to display the message "Pull away complete. Suggest high range engaged" (D4). The driver can then implement the transfer case range change from low to high using the range selector means 21 (D5).

A range change request signal is received from the range change selector 21 in response to a driver request (A1). Upon receive of the range change request signal over the communications network 23, the TCM 25 and/or the GSM 31 request neutral in the transmission 7; the GSM 31 inhibits gear selection; the PCM 29 inhibits throttle pedal input; and the ABS control module 27 applies the brakes and/or controls wheel speed (A2). The transfer case 3 then performs the range change (A3). The TCM 25 engages an appropriate gear; the GSM 31 permits gear selection; and the PCM 29 enables throttle pedal inputs (A4). The range change is then complete (A5).

A calibratable speed threshold can optionally be set at which the TCCM 2 prompts the driver to engage high range. The TCCM 2 can, for example, monitor the vehicle speed and output the prompt once the vehicle 5 is moving at a constant speed; or a high enough vehicle speed has been detected that low range is no longer necessary. The speed threshold could be set through the use of steering wheel mounted controls, or through the use of the range change selector 21. This functionality could also be incorporated into the low range $V_{max}$ upshift discussed herein.

This control strategy can be implemented in conjunction with, or independently of the general control strategy described herein with reference to FIGS. 2 and 3. The TCCM 2 checks the communication network 23 for a towing signal indicating that a trailer is connected to the vehicle 5. Alternatively, or in addition, the TCCM 2 (or other control logic) can monitor one or more of the following: powertrain torque, vehicle orientation and acceleration to determine if high torque is required for running. The high torque requirement can in itself provide a suitable indicator that the vehicle 5 is towing a trailer.

Upon detection of a positive towing signal or an overly heavy load upon the powertrain, the TCCM 2 outputs a driver prompt recommending that the transfer case low range is engaged to provide improved vehicle control. The driver prompt can, for example, be output to the driver as a message through the High Level Display Front (HLDF) or the IPCM 33. In response to the prompt, the driver can implement the range change either through the use of steering wheel mounted controls or the range change selector 21 (utilising the primary or secondary function described herein). The range change function is the same irrespective of whether the driver uses the steering wheel mounted controls or the range change selector 21 to implement the range change. The message can be dismissed, for example using the steering wheel controls.

When in low range and cruising at a (steady-state) speed after setting off with a trailer, the TCCM 2 prompts the driver to engage high range. The cruising speed can be calibratable, for example by the driver or the OEM. This functionality can optionally be inhibited if the vehicle is operating in an off-road mode. The prompt can, for example, be output to the driver as a message through the High Level Display Front (HLDF) or the IPCM 33. In response to the prompt, the driver can implement the range change either through the use of steering wheel mounted controls or the range change selector 21 (utilising the primary function associated therewith). The range change function is the same irrespective of whether the driver uses the steering wheel mounted controls or the range change selector 21 to implement the range change. The message can be dismissed, for example using the steering wheel controls.

The TCCM 2 can also monitor the communications network 23 to determine the vehicle orientation (which can, for example, be measured by one or more gyroscopes and/or accelerometers disposed on the vehicle). If the vehicle orientation exceeds a defined threshold, the TCCM 2 determines that the vehicle 5 is on a steep incline and outputs a prompt to the driver to engage low range. Again, the TCCM 2 could determine that the vehicle is starting off on an incline based on the powertrain torque required to displace the vehicle.

Low Range $V_{max}$ Upshift

The TCCM 2 can operate to change from a low range to a high range based on the vehicle speed and/or acceleration. This operating mode allows the TCCM 2 to change range automatically during hard acceleration or as the speed of the vehicle approaches that of the maximum speed capability in low range. The TCCM 2 can be configured automatically to change from low range to high range when the acceleration rate of the vehicle results in the low range $V_{max}$ (i.e. the maximum permitted vehicle speed when the low range is engaged) being reached or exceeded. The TCCM 2 can also provide a calibratable speed at which the vehicle will automatically perform a change from low range to high range depending on various signals received over the communications network 23.

The control strategy implemented by the TCCM 2 is illustrated in a fifth block diagram shown in FIG. 7. The TCCM 2 detects that the transfer case 3 is operating in a low range (E1). The TCCM 2 monitors vehicle acceleration and determines when the vehicle speed is equal to or greater than a maximum low range speed $V_{MAX}$ (E2). The TCCM 2 outputs a driver prompt to the IPCM 33 to recommend that high range is engaged, either by the steering wheel controls or the range selector means 21 (E3). The driver can then implement the range change from low to high using the range selector means 21 (E4). The TCCM 2 could alternatively be configured to implement an automated range change by checking the calibration parameters (E5); and, provided these are satisfied, performing an automated transfer case upshift from low range to high range (E6). The transfer case 3 can perform the upshift automatically without the need for driver input (E4).

The TCCM 2 can also implement an automated shift into high range when a kickdown switch on the throttle pedal is activated. The TCCM 2 can be configured to detect a kickdown signal over the communications network 23 when the kickdown switch is activated. This operating mode would also play a role in the functional safety of the system, allowing an automatic shift to high range to increase the maximum speed of the vehicle, for example when the driver forgets that they are in low range and accelerates onto a high speed road.

Figure 8:
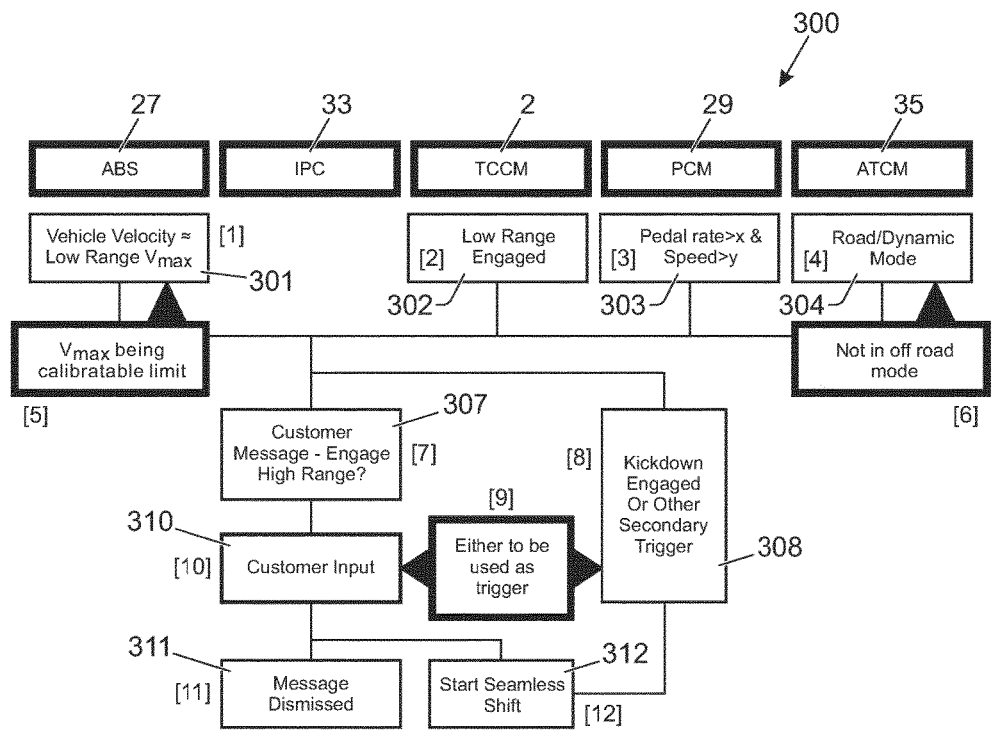
FIG. 8 shows a third flow chart showing implementation of the control strategy illustrated in FIG. 7.

This control strategy can be implemented in conjunction with, or independently of the general control strategy described herein with reference to FIGS. 2 and 3. This operating mode is illustrated in the third flow diagram 300 shown in FIG. 8. The TCCM 2 determines that the transfer case 3 is in a low range [STEP 302]. The TCCM 2 is configured to monitor vehicle acceleration, vehicle speed and throttle position to assess how aggressively the driver is driving [STEP 303]. When in low range, these parameters can be monitored to predict the point at which the vehicle will reach a maximum speed threshold for low range [STEP 301]. When the vehicle 5 is at or near this maximum speed threshold the TCCM 2 can output information to the IPCM 33 [STEP 307] to prompt the driver to change from low range to high range. The driver can implement the range change using the range change selector 21 to implement the primary or secondary functions described herein [STEP 310].

The driver can dismiss the information displayed on the IPCM 33 [STEP 311]. Alternatively, the driver can operate the range change selector 21 to implement the range change [STEP 312]. In response to the user input, the TCCM 2 initiates the range change.

A secondary upshift means could be identified, such as the kickdown switch [STEP 308] on the throttle pedal. The TCCM 2 can be configured to implement the range change when the kickdown switch is operated. The point at which this behaviour is effective could be calibrated so as not to interfere with the intent to change down a number of gears to maximise acceleration.

Alternatively, a timing method could be employed such that if a certain amount of throttle were seen over a given period of time then the vehicle would shift to high range. This would also be calibratable to show the intent of the driver to accelerate even though they have reached the maximum velocity in low range.

Engine Start Range Check

This operating mode automatically checks whether low range is required when the engine is started. This mode can assist the driver to select the appropriate transfer case range after having driven the vehicle 5 off-road or after a trailer is decoupled. The range change can, for example, be implemented through the use of range change selector 21 or the steering wheel controls.

Figure 9:
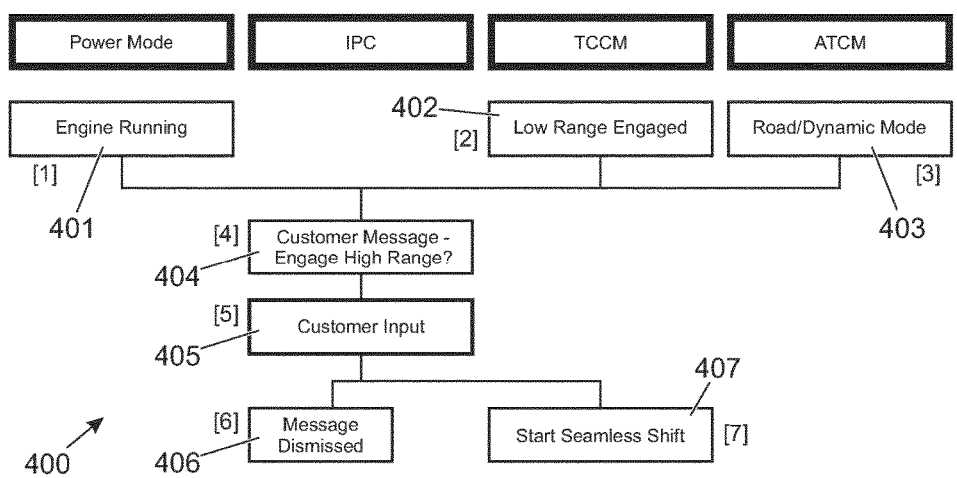
FIG. 9 shows a fourth flow chart showing implementation of the control strategy upon engine ignition.

This control strategy can be implemented in conjunction with, or independently of the general control strategy described herein with reference to FIGS. 2 and 3. This operating mode is illustrated in the fourth flow diagram 400 shown in FIG. 9. The TCCM 2 detects an engine ignition signal over the communications network [STEP 401]. The TCCM 2 monitors the current transfer case range [STEP 402] and the vehicle operating mode currently active in the ATCM 35 [STEP 403]. If the transfer case low range is engaged and the vehicle operating mode is configured for transfer case high range (for example the ATCM 35 is operating in a Road/Dynamic mode), the TCCM 2 outputs a driver prompt upon detection of the ignition cycle [STEP 404]. The driver prompt recommends that the transfer case high range is engaged. The prompt can, for example, take the form of a message displayed on the IPCM 33. The driver makes the appropriate input [STEP 405]. To perform the range change, the driver can activate the range change selector 21 to provide the primary or secondary functions described herein [STEP 407].

The message can optionally be dismissed [STEP 406] by the driver, for example through the use of the steering wheel mounted controls. The TCCM 2 would inhibit output of the prompt if the ATCM 35 is in an operating mode which defaults to the transfer case low range (for example an off-road mode, such as rock crawl).

Vehicle Operating Mode Interface

The TCCM 2 can be integrated with other vehicle systems, such as the ATCM 35 for engaging different vehicle operating modes, such as: Rock Crawl; Mud; Sand; Grass/Gravel/Snow; Road; and Dynamic. Some of the vehicle operating modes (such as Rock Crawl) can optionally be configured to require that the transfer case operates in a low range. Conversely, some of the vehicle operating modes can optionally be configured to require that the transfer case operates in a high range. Some or all of the vehicle operating modes can have a preferred transfer case operating range which is not essential. For example, the Mud, Sand and Grass/Gravel/Snow operating modes can be optimised for operation in the transfer case low range; and the Road and Dynamic operating modes can be optimised for operation in the transfer case high range. In the past, the driver would have been required manually to engage the appropriate transfer case range based on the selected vehicle operating mode.

If the transfer case high range is engaged, the TCCM 2 is configured automatically to engage low range when a vehicle operating mode requiring low range is selected (either by the driver or automatically). The TCCM 2 can engage low range 1 after a period of time has elapsed (the period of time can optionally be calibrated by the driver or the OEM). When a different vehicle operating mode is selected, for example one optimised for operation in the transfer case high range, the TCCM 2 can prompt the driver to confirm whether they still require low range. At least in certain embodiments, when an operating mode is selected which requires the transfer case high range, the TCCM 2 can automatically engage the transfer case high range, for example in anticipation of a higher speed driving.

This control strategy can be implemented in conjunction with, or independently of the general control strategy described herein with reference to FIGS. 2 and 3. This operating mode is applicable to a vehicle 5 operable in different modes which alter the response of the vehicle characteristics (such as performance, driveability and dynamics). One or more of the vehicle operating modes can require (or would be complemented by) engagement of the transfer case low range, for example to aid traction. The vehicle operating modes can broadly be classified as off-road modes and on-road modes. The off-road modes can further be classified as low-range off-road modes (i.e. off-road operating modes which require or are complemented by selecting low range) and high-range off-road modes (i.e. off-road operating modes which do not require selection of the low range). In the present embodiment, the low-range off-road modes are Rock Crawl and Mud; and the high-range off-road modes are Sand and Grass Gravel Snow (GGS). In the present embodiment, the on-road modes, such as Road and Dynamic, are usually selected when the vehicle will be driving at speeds above that allowed in the transfer case low range (and when improved fuel economy is required) so the transfer case high range is typically engaged. The vehicle operating modes can be selected by the driver, for example through the HMI, or automatically by the vehicle 5. The TCCM 2 accesses the communications network 23 to determine which vehicle operating mode is currently selected and accesses a look-up table to determine whether the selected vehicle operating mode is a low-range off-road mode or a high-range off-road mode.

Figure 10:
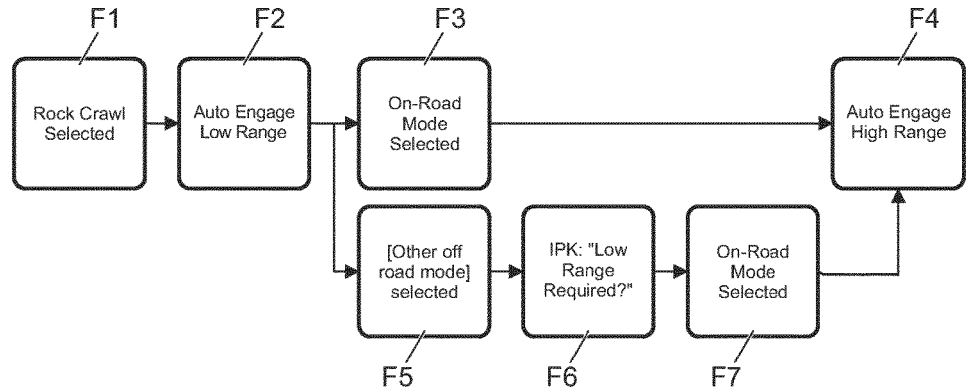
FIG. 10 shows a sixth block diagram illustrating operation of the vehicle control system in dependence on a selected vehicle operating mode.

This operating strategy for integrating the TCCM 2 with the ATCM 35 is illustrated in a sixth block diagram shown in FIG. 10. The ATCM 35 is operated to select a Rock Crawl mode (F1) and the low range is automatically engaged (F2). If the ATCM 35 is subsequently operated to select a Road mode (F3), the TCCM 2 controls the transfer case 3 automatically to select the high range (F4). If the ATCM 35 is operated to select an off-road mode other than Rock Crawl (F5), a prompt is output to the IPC 33 to display the message "Low Range Required?" (F6). If a Road mode is subsequently selected (F7), the TCCM 2 controls the transfer case 3 to engage the high range (F4).

Figure 11:
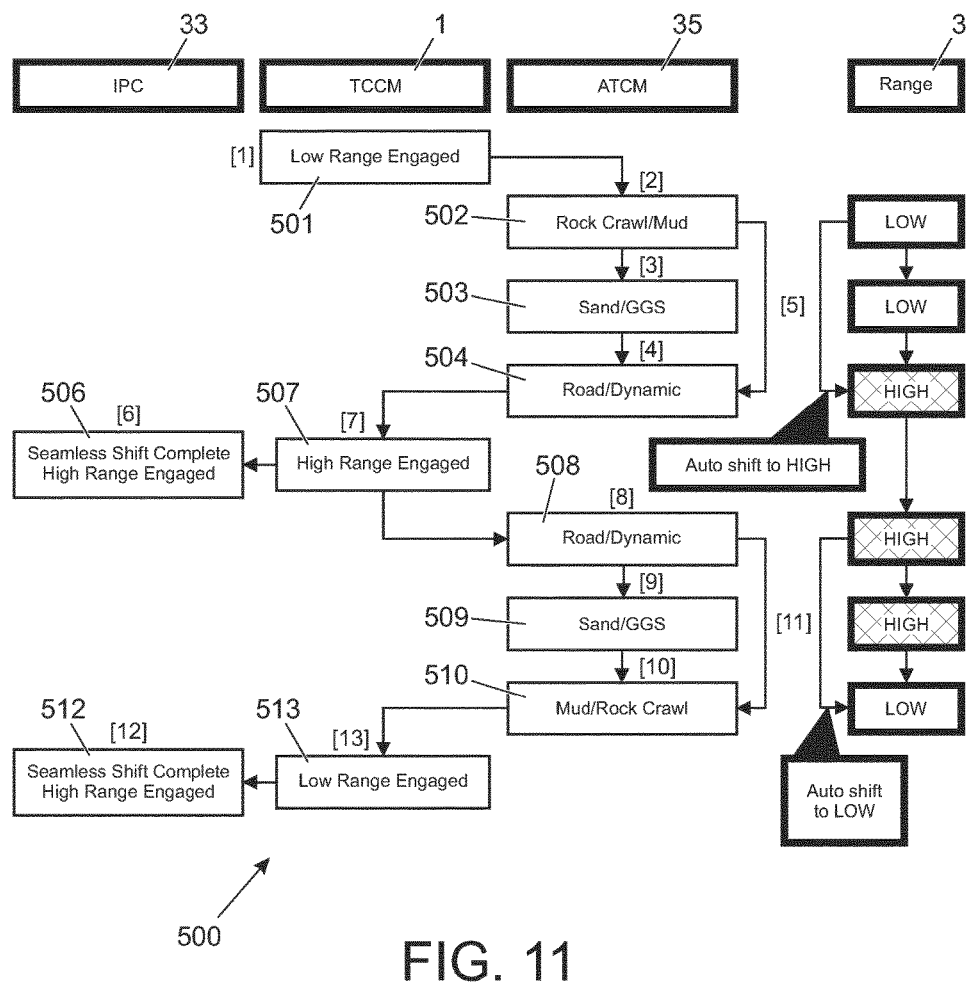
FIG. 11 shows a fifth flow chart showing implementation of the control strategy illustrated in FIG. 10.

This control mode will now be described with reference to a fifth flow chart 500 shown in FIG. 11 (the selected high/low range of the transfer case 3 is illustrated in the right hand column). When engaging a low-range off-road operating mode, the TCCM 2 starts a timer before automatically engaging low range. When disengaging that vehicle operating mode, the TCCM 2 automatically engages a transfer case high range.

When the transfer case low range is engaged [STEP 501], the TCCM 2 implements the following control logic:
  i. The TCCM 2 will not engage the high range if a low-range off-road operating mode is disengaged [STEP 502] and another off-road operating mode is selected [STEP 503] (irrespective of whether the newly selected operating mode is a high-range or a low-range off-road operating mode).
  ii. The TCCM 2 will engage the high range if an on-road vehicle operating mode is selected [STEP 505].
  iii. If an on-road mode is engaged indirectly after a low-range off-road operating mode, the TCCM 2 will engage high range [STEP 504].
  iv. If a high-range off-road operating mode is engaged then the TCCM 2 will not shift to low range unless requested to do so by the driver.

The high range is engaged [STEP 507] and the range change is then completed [STEP 506].

When the transfer case high range is engaged [STEP 507], the TCCM 2 implements the following control logic:
  i. The TCCM 2 remains in the high range if the vehicle operating mode changes from an on-road operating mode [STEP 508] to a high-range off-road operating mode [STEP 509].
  ii. The TCCM 2 will engage the low range if a low-range off-road operating mode is engaged [STEP 510].

The high range is engaged [STEP 513] and the range change is then completed [STEP 512].

The TCCM 2 will not automatically change range (from high to low range; or from low to high range) when the vehicle operating modes change based on automated control logic.

Furthermore, the TCCM 2 can be configured to inhibit range changes if the range change would result in a reduction in the output (drive) torque. A transfer case upshift typically results in a decrease in the engine speed which can result in a corresponding reduction in the output torque, particularly for a petrol internal combustion engine.

It will be appreciated that various changes and modifications can be made to the disclosed examples presented above without departing from the scope of legal protection provided by the following claims.

The invention claimed is:

1. A vehicle control system for controlling a vehicle transfer case operable in a high range and a low range; the vehicle control system comprising at least one electronic controller configured to output a range change signal to implement a transfer case range change, a brake control signal for controlling vehicle braking during the range change, and a selector control signal for inhibiting a gear selector during implementation of the range change.

2. A vehicle control system as claimed in claim 1, wherein the brake control signal is operative to either hold the vehicle stationary during the range change or to control a vehicle speed during the range change.

3. A vehicle control system as claimed in claim 1, wherein the at least one electronic controller is configured to output a transmission control signal for controlling a vehicle transmission, and
wherein the transmission control signal comprises at least one of
a neutral select request for engaging neutral in the vehicle transmission before said range change is initiated; and
a gear select request for engaging a gear in the vehicle transmission after said range change has been completed.

4. A vehicle control system as claimed in claim 1, wherein the at least one electronic controller is configured to monitor one or more vehicle operating parameters and to output said range change signal in dependence on said one or more vehicle operating parameters.

5. A vehicle control system for controlling a vehicle transfer case operable in a high range and a low range, the vehicle control system comprising at least one electronic controller configured to
monitor one or more vehicle operating parameters;
output a range change signal for initiating a transfer case range change in dependence on said one or more vehicle operating parameters; and
output a selector control signal for inhibiting a gear selector during implementation of the range change.

6. A vehicle control system as claimed in claim 5, wherein said one or more vehicle operating parameters comprise at least one of a vehicle speed and a vehicle acceleration, and
wherein said range change signal comprises an upshift request to implement a range change from the low range to the high range when at least one of said vehicle speed is greater than or equal to a predefined speed threshold and said vehicle acceleration is greater than or equal to a predefined acceleration threshold.

7. A vehicle control system as claimed in claim 6, wherein said control system is configured to inhibit output of said range change signal when the vehicle speed is above a second predefined speed threshold.

8. A vehicle control system as claimed in claim 5, wherein said one or more vehicle operating parameters comprise a torque request for determining a loading of the vehicle, and
wherein said range change signal comprises a downshift request to implement a range change from the high range to the low range when the loading of the vehicle is greater than or equal to a predefined load threshold.

9. A vehicle control system as claimed in claim 5, wherein said one or more vehicle operating parameters comprise a rotational speed of an input shaft for the transfer case;
the at least one electronic controller is configured to inhibit the output of the range change signal when the rotational speed is above an input shaft speed threshold.

10. A vehicle control system as claimed in claim 5, wherein said one or more vehicle operating parameters comprises an engine speed, the at least one electronic controller being configured to output a powertrain control signal to limit or control engine speed during the range change.

11. A vehicle control system as claimed in claim 5, wherein said one or more vehicle operating parameters comprises a current operating range of the transfer case;
wherein, if the transfer case is operating in said low range, the at least one electronic controller is configured to output the range change signal comprising an upshift request to implement a range change from the low range to the high range; and, if the transfer case is operating in said high range, the at least one electronic controller is configured to output the range change signal comprising a downshift request to implement a range change from the high range to the low range.

12. A vehicle control system as claimed in claim 5, wherein the at least one electronic controller is configured to output a transmission control signal for inhibiting engagement of a gear during the range change.

13. A vehicle control system as claimed in claim 5, wherein the at least one electronic controller is configured to monitor vehicle systems and to output the range change signal when the following conditions are satisfied:
a vehicle transmission is in neutral; and
a vehicle speed is within a predefined range or less than a predefined threshold.

14. A vehicle control system as claimed in claim 5, wherein the vehicle control system is configured to output the range change signal when a rotational speed of an input shaft to the transfer case is below an input shaft speed threshold.

15. A method of controlling a vehicle transfer case operable in a high range and a low range, the method comprising:
monitoring one or more vehicle operating parameters;
outputting a range change signal for initiating a transfer case range change in dependence on said one or more vehicle operating parameters; and
outputting a selector control signal for inhibiting a gear selector during implementation of the range change.

16. A method as claimed in claim 15, wherein
said one or more vehicle operating parameters comprise at least one of a vehicle speed and a vehicle acceleration; and
said range change signal comprises an upshift request to implement a range change from the low range to the high range when at least one of said vehicle speed is greater than or equal to a predefined speed threshold and said vehicle acceleration is greater than or equal to a predefined acceleration threshold.

17. A method as claimed in claim 16, wherein said method comprises inhibiting output of said range change signal when the vehicle speed is above a second predefined speed threshold.

18. A method as claimed in claim 15, wherein
said one or more vehicle operating parameters comprises a torque request;
the method includes determining a loading of the vehicle based on said torque request; and
said range change signal comprises a downshift request to implement a range change from the high range to the low range when the loading of the vehicle is greater than or equal to a predefined load threshold.

19. A method as claimed in claim 15, wherein
said one or more vehicle operating parameters comprises a rotational speed of an input shaft for the transfer case; and the method comprises inhibiting the output of the range change signal when the rotational speed of the input shaft is above an input shaft speed threshold.

20. A method as claimed in claim 15, wherein said one or more vehicle operating parameters comprises an engine speed, and the method comprises outputting a powertrain control signal to limit or control the engine speed during the range change.

21. A method as claimed in claim 15, wherein said one or more vehicle operating parameters comprises a current operating range of the transfer case;

wherein the method comprises outputting a range change signal comprising an upshift request to implement a range change from the low range to the high range when the transfer case is operating in said low range; and outputting a range change signal comprising a downshift request to implement a range change from the high range to the low range when the transfer case is operating in said high range.

22. A method as claimed in claim 15, comprising outputting a transmission control signal for inhibiting engagement of a gear during the range change.

23. A method as claimed in claim 15, comprising outputting the range change signal when the following operating conditions are satisfied:

a vehicle transmission is in neutral; and a vehicle speed is within a predefined range or less than a predefined threshold.

* * * * *